United States Patent
Hassan et al.

(10) Patent No.: US 9,414,417 B2
(45) Date of Patent: Aug. 9, 2016

(54) PROPAGATING COMMUNICATION AWARENESS OVER A CELLULAR NETWORK

(71) Applicant: Microsoft Technology Licensing, LLC, Redmond, WA (US)

(72) Inventors: Amer A. Hassan, Kirkland, WA (US); William George Verthein, Sammamish, WA (US); Pascal Francis Menezes, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/454,545

(22) Filed: Aug. 7, 2014

(65) Prior Publication Data

US 2016/0044716 A1    Feb. 11, 2016

(51) Int. Cl.
*H04W 72/00*     (2009.01)
*H04W 76/02*     (2009.01)
*H04W 72/04*     (2009.01)
*H04L 29/08*     (2006.01)
*H04W 52/04*     (2009.01)

(52) U.S. Cl.
CPC ............ *H04W 76/02* (2013.01); *H04L 67/14* (2013.01); *H04W 72/04* (2013.01); *H04W 52/04* (2013.01)

(58) Field of Classification Search
USPC .............. 455/450–456.3, 414.1, 422.1, 550.1
See application file for complete search history.

(56) References Cited

U.S. PATENT DOCUMENTS

| | | |
|---|---|---|
| 6,901,403 B1 | 5/2005 | Bata et al. |
| 6,957,071 B1 | 10/2005 | Holur et al. |
| 7,706,785 B2 | 4/2010 | Lei et al. |
| 7,987,490 B2 | 7/2011 | Ansari et al. |
| 8,139,504 B2 | 3/2012 | Mankins et al. |
| 8,285,810 B2 | 10/2012 | Svendsen et al. |
| 8,296,380 B1 | 10/2012 | Kelly et al. |
| 8,300,614 B2 | 10/2012 | Ankaiah et al. |
| 8,341,037 B2 | 12/2012 | Bachman et al. |
| 8,402,071 B2 | 3/2013 | Skillcorn |
| 8,526,993 B2 | 9/2013 | Bria et al. |
| 8,538,351 B2 | 9/2013 | Wilson et al. |

(Continued)

FOREIGN PATENT DOCUMENTS

| | | |
|---|---|---|
| EP | 2144177 | 1/2010 |
| WO | WO-0051299 | 8/2000 |

(Continued)

OTHER PUBLICATIONS

Elnaka, et al., "Real-Time Traffic Classification for Unified Communication Networks", In Proceedings of International Conference on Selected Topics in Mobile and Wireless Networking, Aug. 19, 2013, 6 pages.

(Continued)

*Primary Examiner* — Fayyaz Alam
(74) *Attorney, Agent, or Firm* — Tom Wong; Micky Minhas

(57) ABSTRACT

Techniques for propagating communication awareness over a cellular network are described. According to various implementations, communication awareness of a communication session is propagated to an infrastructure component of a cellular network, such as a base station controller. Communication awareness of a communication session, for instance, can be employed to control various operational parameters of a cellular device that participates in a communication session.

20 Claims, 8 Drawing Sheets

(56) References Cited

U.S. PATENT DOCUMENTS

| | | | |
|---|---|---|---|
| 8,605,700 | B2 | 12/2013 | Gurin |
| 8,612,888 | B2 | 12/2013 | Pennington et al. |
| 8,693,500 | B2 | 4/2014 | Ludwig et al. |
| 8,756,510 | B2 | 6/2014 | Bhumkar et al. |
| 9,304,235 | B2 | 4/2016 | Sainiema et al. |
| 2003/0021404 | A1 | 1/2003 | Wengrovitz |
| 2004/0141637 | A1 | 7/2004 | Bacus et al. |
| 2006/0271691 | A1 | 11/2006 | Jacobs et al. |
| 2007/0033225 | A1 | 2/2007 | Davis |
| 2007/0214180 | A1 | 9/2007 | Crawford |
| 2007/0253545 | A1 | 11/2007 | Chatterjee et al. |
| 2008/0092054 | A1 | 4/2008 | Bhumkar et al. |
| 2008/0120571 | A1 | 5/2008 | Chang et al. |
| 2009/0198581 | A1 | 8/2009 | Lidestri |
| 2009/0199128 | A1 | 8/2009 | Matthews et al. |
| 2009/0235203 | A1 | 9/2009 | Iizuka |
| 2009/0265416 | A1 | 10/2009 | Svendsen et al. |
| 2010/0005168 | A1 | 1/2010 | Williams et al. |
| 2010/0005397 | A1 | 1/2010 | Lanahan et al. |
| 2010/0023691 | A1 | 1/2010 | Shin |
| 2010/0042648 | A1 | 2/2010 | Cannon et al. |
| 2010/0094934 | A1 | 4/2010 | Svendsen et al. |
| 2010/0146130 | A1* | 6/2010 | Montemurro .......... H04L 63/20 709/228 |
| 2010/0191827 | A1 | 7/2010 | Martin |
| 2010/0211575 | A1 | 8/2010 | Collins et al. |
| 2010/0262582 | A1 | 10/2010 | Garcia-Ascanio |
| 2010/0299417 | A1 | 11/2010 | Austin et al. |
| 2010/0299697 | A1 | 11/2010 | Austin et al. |
| 2010/0332456 | A1 | 12/2010 | Prahlad et al. |
| 2011/0087531 | A1 | 4/2011 | Winters et al. |
| 2011/0087674 | A1 | 4/2011 | Schokking et al. |
| 2011/0099199 | A1 | 4/2011 | Stalenhoef et al. |
| 2011/0106798 | A1 | 5/2011 | Li et al. |
| 2011/0154198 | A1 | 6/2011 | Bachman et al. |
| 2011/0161174 | A1 | 6/2011 | Simms et al. |
| 2011/0161409 | A1 | 6/2011 | Nair et al. |
| 2011/0175930 | A1 | 7/2011 | Hwang et al. |
| 2011/0231745 | A1 | 9/2011 | Levesque et al. |
| 2011/0283185 | A1 | 11/2011 | Obasanjo et al. |
| 2012/0030213 | A1 | 2/2012 | Arrouye et al. |
| 2012/0113964 | A1 | 5/2012 | Petersen et al. |
| 2012/0208168 | A1 | 8/2012 | Atkinson et al. |
| 2012/0271823 | A1 | 10/2012 | Asikainen et al. |
| 2012/0290654 | A1 | 11/2012 | Detwiller et al. |
| 2012/0331141 | A1 | 12/2012 | Carter et al. |
| 2013/0024424 | A1 | 1/2013 | Prahlad et al. |
| 2013/0027613 | A1 | 1/2013 | Kim et al. |
| 2013/0042275 | A1 | 2/2013 | Payette et al. |
| 2013/0091204 | A1 | 4/2013 | Loh et al. |
| 2013/0198176 | A1 | 8/2013 | Kim |
| 2013/0226931 | A1 | 8/2013 | Hazel et al. |
| 2013/0254412 | A1 | 9/2013 | Menezes et al. |
| 2013/0339446 | A1 | 12/2013 | Balassanian et al. |
| 2013/0343291 | A1 | 12/2013 | Gao et al. |
| 2014/0086081 | A1 | 3/2014 | Mack et al. |
| 2014/0092765 | A1 | 4/2014 | Agarwal et al. |
| 2014/0098671 | A1 | 4/2014 | Raleigh et al. |
| 2014/0133456 | A1 | 5/2014 | Donepudi et al. |
| 2014/0143351 | A1 | 5/2014 | Deng |
| 2014/0148170 | A1 | 5/2014 | Damji et al. |
| 2014/0153390 | A1 | 6/2014 | Ishii et al. |
| 2015/0002614 | A1* | 1/2015 | Zino ....................... H04L 12/18 348/14.08 |
| 2016/0019279 | A1 | 1/2016 | Sengupta et al. |
| 2016/0036692 | A1 | 2/2016 | Leeb et al. |

FOREIGN PATENT DOCUMENTS

| | | |
|---|---|---|
| WO | WO-2010049002 | 5/2010 |
| WO | WO-2013117211 | 8/2013 |
| WO | WO-2014071308 | 5/2014 |

OTHER PUBLICATIONS

Ksentini, "Building the Bridges between QoS and QoE for Network Control Mechanisms", In Dissertation of University of Rennes, Jul. 3, 2013, 66 pages.

Li, et al., "QRON: QoS-Aware Routing in Overlay Networks", In Proceedings of IEEE Journal on Selected Areas in Communications, vol. 22, No. 1, Jan. 2004, 12 pages.

"International Search Report and the Written Opinion", Application No. PCT/US2015/042371, Oct. 2, 2015, 10 pages.

Garcia,"COMET: Content Mediator Architecture for Content-Aware Networks", 2011, 8 pages.

"Can I see a Skydrive folder in Windows as computer disk?", retrieved from http://forums.techarena.in/technology-internet/1386082.htm on Aug. 5, 2011, 3 pages.

"Final Office Action", U.S. Appl. No. 13/229,554, Dec. 4, 2013, 19 pages.

"Final Office Action", U.S. Appl. No. 13/551,297, Nov. 5, 2014, 18 pages.

"International Search Report and Written Opinion", Application No. PCT/US2015/042187, Oct. 20, 2015, 10 pages.

"International Search Report and Written Opinion", Application No. PCT/US2015/042259, Oct. 12, 2015, 11 pages.

"International Search Report and Written Opinion", Application No. PCT/US2015/041046, Nov. 9, 2015, 15 pages.

"International Search Report and Written Opinion", Application No. PCT/US2015/043892, Feb. 11, 2016, 19 Pages.

"Invitation to Pay Additional Fees", Application No. PCT/US2015/043892, Nov. 4, 2015, 6 pages.

"Non-Final Office Action", U.S. Appl. No. 13/229,554, Aug. 16, 2013, 16 pages.

"Non-Final Office Action", U.S. Appl. No. 13/229,554, Nov. 17, 2014, 25 pages.

"Non-Final Office Action", Application No. 13/551,297, May 23, 2014, 17 pages.

"Supplemental Notice of Allowance", U.S. Appl. No. 14/447,464, Jan. 12, 2016, 2 pages.

"Windows Live Logo Windows Live SkyDrive", retrieved from http://toostep.com/trends/india-one-three-chosen-to-test-skydrive-online-storage on Aug. 5, 2011, 2 pages.

"Windows Phone—Pictures Hub", retrieved from http://www.microsoft.com/windowsphone/en-gb/howto/wp7/pictures/pictures-hub.aspx on Jun. 21, 2012, 2012, 2 pages.

Antonopoulos,"Efficient Updates for Web-Scale Indexes over the Cloud", IEEE 28th International Conference on Data Engineering Workshops, Apr. 2012, 8 pages.

Levandoski,"Ranking and New Database Architectures", In Proceedings of the 7th International Workshop on Ranking in Databases, Aug. 2013, 4 pages.

Snavely,"Modeling the World from Internet Photo Collections", International Journal of Computer Vision, vol. 80, Issue 2—Available at <http://phototour.cs.washington.edu/ModelingTheWorld_ijcv07.pdf>, Nov. 2008, 22 pages.

* cited by examiner

200

| Media Type | Codec Rate | Packet Error Rate | Power | |
|---|---|---|---|---|
| Audio | X Kbps | 10% | A dBm | [ ... ] |
| | X' Kbps | 5% | A' dBm | |
| Video | Y Kbps | 10% | B dBm | |
| | Y' Mbps | 5% | B' dBm | |
| Audio + Video | Z Kbps | 5% | C dBm | |
| | Z' Mbps | 5% | C' dBm | |
| File Sharing | XY Kbps | 2% | D' dBm | |
| | XY' Kbps | 1% | D' dBm | |
| ⋮ | | | | |

202 — Media Type
204 — Codec Rate
206 — Packet Error Rate
208 — Power

*Fig. 2*

PROPAGATING COMMUNICATION AWARENESS OVER A CELLULAR NETWORK

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Such integrated systems are sometimes referred to as Unified Communication and Collaboration (UC&C) systems.

While UC&C systems provide for increased flexibility in communications, they also present a number of implementation challenges. For instance, a UC&C system typically utilizes multiple interconnected networks to route various communications. Since different networks may be managed by different entities, challenges thus arise in managing communications quality for communications that are routed among independently managed networks. Further, individual networks and network managers may not have visibility into media types and session constraints for UC&C data streams, and thus may be unable to adjust network settings to optimize network, session, and device performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for propagating communication awareness over a cellular network are described. According to various implementations, communication awareness of a communication session is propagated to an infrastructure component of a cellular network, such as a base station controller. Communication awareness of a communication session, for instance, can be employed to control various operational parameters of a cellular device that participates in a communication session.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 illustrates an example resource policy table in accordance with one or more embodiments.

DETAILED DESCRIPTION

Overview

Figure 1:
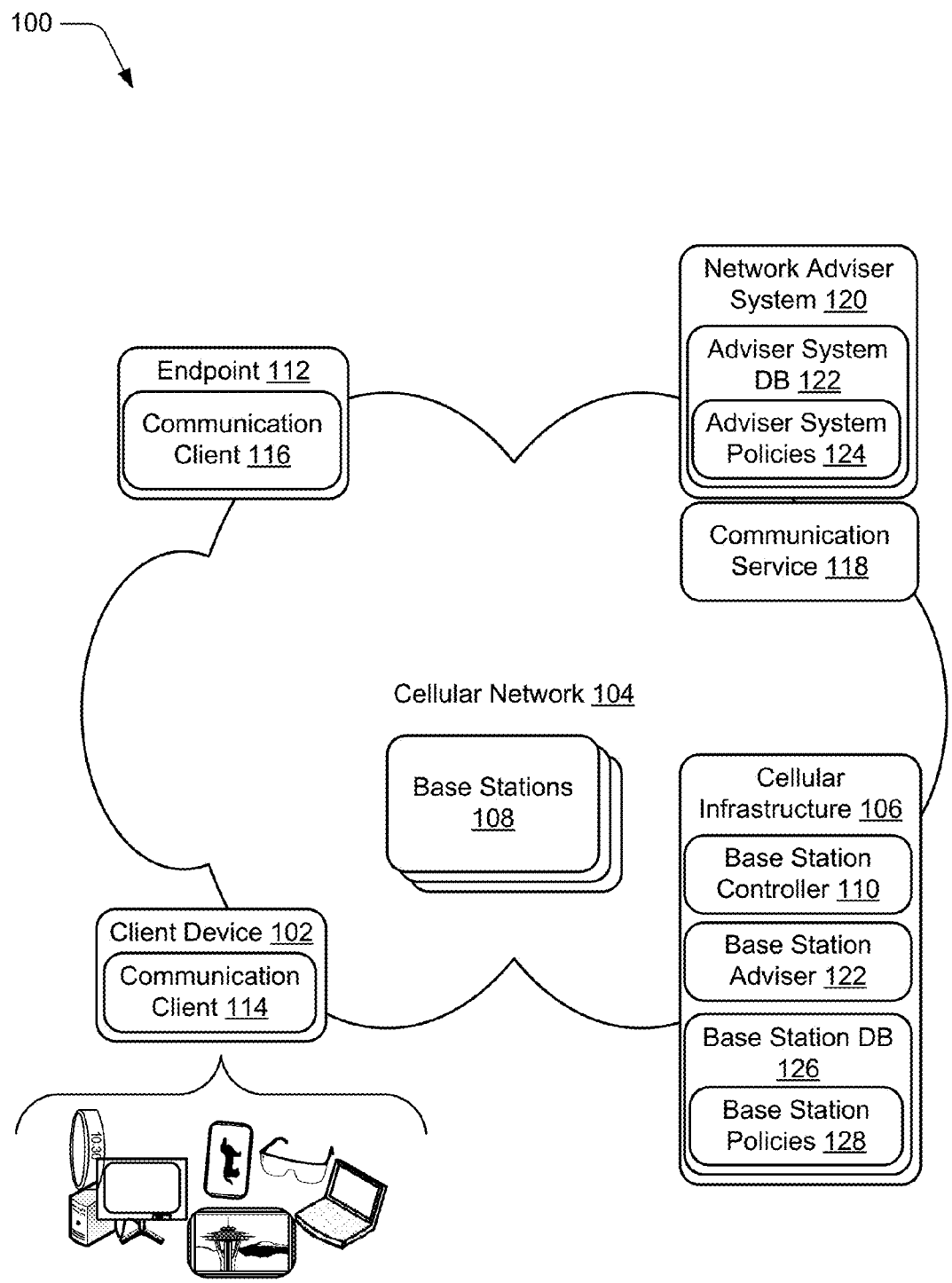
FIG. 1 is an illustration of an environment in an example implementation that is operable to employ techniques discussed herein.

Techniques for propagating communication awareness over a cellular network are described. In at least some embodiments, a communication session refers to a real-time exchange of communication media between different communication endpoints. For instance, a communication session refers to an exchange of communication data over a data connection that is distinct from a cellular voice connection. Examples of a communication session include a Voice over Internet Protocol (VoIP) call, a video call, text messaging, a file transfer, content sharing, and/or combinations thereof. In at least some embodiments, a communication session represents a Unified Communication and Collaboration (UC&C) session.

According to various implementations, communication awareness of a communication session is propagated to an infrastructure component of a cellular network, such as a base station controller. Generally, communication awareness includes attributes of the communication session, such as identifiers for endpoints involved in the communication session, media type(s) included in the media session, encoding rate for the communication session, and so forth. Communication awareness, for instance, is propagated independently from a data stream that carries the communication session. Thus, propagation of communication awareness for a communication session is independent from the communication session itself.

According to various implementations, communication awareness of a communication session can be employed to control various operational parameters of a communication session. For instance, a base station controller can instruct a base station to provide operational parameters to a cellular device, such as a transmission power to be used for transmitted communication session data from the cellular device. Various other operational parameters may be specified, examples of which are detailed below.

Thus, techniques discussed herein provide diverse scenarios for enlightening cellular network components with communication awareness. Such communication awareness enables entities involved in routing communication sessions to make informed decisions regarding routing and handling of communication session data.

In the following discussion, an example environment is first described that is operable to employ techniques described herein. Next, a section entitled "Propagating Communication Awareness" discusses some example ways for propagating communication awareness in accordance with one or more embodiments. Following this, a section entitled "Example Implementation Scenarios" describes some example implementation scenarios in accordance with one or more embodiments. Next, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

FIG. 1 is an illustration of an environment 100 in an example implementation that is operable to employ techniques for propagating communication awareness over a cellular network described herein. Generally, the environment 100 includes various devices, services, and networks that enable communication via a variety of different modalities. For instance, the environment 100 includes a client device 102 connected to a cellular network 104. The client device 102 may be configured in a variety of ways, such as a traditional computer (e.g., a desktop personal computer, laptop computer, and so on), a mobile station, an entertainment appliance, a smartphone, a wearable device, a netbook, a game console, a handheld device (e.g., a tablet), and so forth.

The cellular network 104 is representative of a network that provides the client device 102 with connectivity to various networks and/or services, such as for voice communication, data communication, and so forth. The cellular network 104 may be provided and/or managed by a particular enterprise entity, such as a cellular service provider. The cellular network 104 may provide the client device 102 with connectivity via a variety of different cellular technologies, such as 3G, 4G (e.g., Long Term Evolution (LTE)), 5G, and so forth.

According to various implementations, the cellular network 104 is implemented via a cellular infrastructure 106, which is representative of functionality to deploy and manage infrastructure components and logic of the cellular network 104. The cellular infrastructure 106 leverages base stations 108 for receiving cellular signal transmission from and transmitting cellular signal to client devices, such as the client device 102. The base stations 108 are distributed over a wide geographic area (e.g., globally) to provide cellular connectivity over diverse geographic locations.

The cellular infrastructure 106 includes a base station controller 110, which is representative of functionality to manage various operational aspects of the base stations 108. The base station controller 110, for instance, manages base station operations for different individual base stations 108 that are distributed over different geographical areas.

According to various implementations, communication between the client device 102 and an endpoint 112 is facilitated via a communication client 114 of the client device 102 and a communication client 116 of the endpoint 112. Generally, the communication clients 114, 116 are representative of functionalities to enable different forms of communication via the client device 102. Examples of the communication clients 114, 116 include a voice communication application (e.g., a VoIP client), a video communication application, a messaging application, a content sharing application, and combinations thereof. The communication clients 114, 116 for instance, enable different communication modalities to be combined to provide diverse communication scenarios. According to various implementations, the endpoint 112 is representative of different devices with which the client device 102 may communicate, such as other client devices.

In at least some implementations, the communication client 114 represents an interface to a communication service 118. Generally, the communication service 118 is representative of a service to perform various tasks for management of communication between the client device 102 and the endpoint 112. The communication service 118, for instance, can manage initiation, moderation, and termination of communication sessions between the communication client 114 and the communication client 116.

The communication service 118 maintains a presence across many different networks and can be implemented according to a variety of different architectures, such as a cloud-based service, a distributed service, a web-based service, and so forth. Examples of the communication service 118 include a VoIP service, an online conferencing service, a UC&C service, and so forth. In at least some embodiments, the communication service 118 may be implemented as or be connected to a private branch exchange (PBX) in communication with a Public Switched Telephone Network ("PSTN") to enable voice communication between the client device 102 and other client devices.

Further to techniques for propagating communication awareness over a cellular network discussed herein, the environment 100 includes a network adviser system 120. Generally, the network adviser system 120 is representative of functionality to propagate communication awareness of communication sessions over a cellular network to different entities. "Communication awareness," for instance, refers to information pertaining to specific instances of communication sessions, networks involved in routing communication sessions, users that participate in communication sessions, and so forth.

According to various implementations, the network adviser system 120 interfaces with a base station adviser 122 deployed as part of and/or in communication with the base station controller 110. For instance, the network adviser system 120 can ascertain communication awareness regarding communication sessions managed by the communication service 118, and can propagate the communication awareness to the base station adviser 122. The base station adviser 122 can interface with the base station controller 110 to enable the base station controller 110 to maintain state awareness of attributes of a communication session and thus make intelligent decisions to optimize device and communication session performance.

In at least some implementations, the base station adviser 122 can be deployed in the cellular infrastructure 106 as an agent of the network adviser system 120. Alternatively, the base station adviser 122 may be deployed and/or implemented independently of the network adviser system 120. Further, while a single base station adviser 122 is illustrated, it is to be appreciated that implementations may deploy individual base station advisers for individual base stations 108.

According to one or more implementations, the network adviser system 120 may be implemented and/or maintained by the communication service 118, such as to propagate communication awareness for communication sessions managed by the communication service 118. Alternatively, the network adviser system 120 may be implemented separately and/or independently from the communication service 118. The network adviser system 120, for instance, may aggregate and propagate communication awareness for different entities and/or systems involved in communication sessions, such as different communication clients and communication services.

According to one or more implementations, the network adviser system 120 maintains an adviser system database (DB) 122, which is representative of functionality to track various information pertaining to management of cellular resources as part of communication sessions. For example, the resource policy DB 122 includes adviser system policies 124 that are to be applied by the base station controller 110 and/or the base stations 108 for communication sessions. Examples of different resource policies are described below.

The cellular infrastructure 106 further includes a base station DB 126, which is representative of functionality to track various information pertaining to management of cellular resources for the cellular network 104. The base station DB 126, for instance, includes base station policies 128 that are to be applied by the base station controller 110 and/or the base stations 108 for communication sessions. In at least some implementations, the base station policies 128 can include resource policies propagated from the adviser system policies 124 to the cellular infrastructure 106. Thus, the base station policies 128 may represent a local instance of at least part of the adviser system policies 124. Alternatively or additionally, the base station policies 128 may include their own particular resource policies that may differ from policies maintained by the adviser system policies 124.

In at least some implementations, the adviser system DB 122 and/or the base station DB 126 may also track communication awareness for various current and historical communication sessions, such as identifiers for individual communication sessions, endpoints involved in individual communication sessions, base stations 108 through which individual communication sessions are routed, and so forth. As further detailed herein, communication awareness pertaining to a communication session can be propagated independently from data of the communication session itself, e.g., in data streams that are separate from data streams of communication sessions. Thus, decisions concerning handling and routing of communication session data may be made without processing and/or handling the actual communication session data.

FIG. 2 illustrates an example resource policy table 200 in accordance with one or more implementations. The resource policy table 200, for instance, specifies resource policies and policy parameters for the adviser system policies 124 and/or the base station policies 128.

According to various implementations, the resource policy table 200 includes a media type column 202, a codec rate column 204, a packet error rate (PER) column 206, and a transmission power column 208. The media type column 202 specifies different media types and combinations of media types that may be included in a communication session. The codec rate column 204 specifies different encoding and/or compression rates that can be used to encode media as part of a communication session.

The PER column 206 specifies a maximum PER threshold for a media type specified by the media type column 202 and at a codec rate specified by the codec rate column 204. According to various implementations, the PER column 206 specifies a percentage of packets incorrectly received relative to a total number of received packets for a data stream of a communication session. In at least some implementations, the PER column 206 may also specify an allowed variation from the indicated PER values, e.g., in terms of percentage over the specified PER values.

The power column 208 specifies a transmission power to be used for transmitting data of a media type specified by the media type column 202 and at a codec rate specified by the codec rate column 204. While the power is specified in units of Decibel-milliwatts (dBm), it is to be appreciated that any suitable power unit may be employed.

As an example resource policy, consider an audio communication session that includes audio media that is encoded at X Kbps. According to the resource policy table 200, the audio communication session has a PER threshold of 10% and a specified transmission power of A dBm. In another example resource policy, consider an audio/video communication session that includes audio and video media encoded at Z' Mbps. According to the resource policy table 200, the audio/video communication session has a PER threshold of 5% and a specified transmission power of C' dBm. Accordingly, in at least some implementations, the individual rows of the resource policy table 200 each correspond to attributes of a different resource policy.

The example policy attributes and values specified by the resource policy table 200 are presented for purpose of example only, and it is to be appreciated that a variety of other attributes and values may be specified for resource policies in accordance with one or more embodiments. For instance, the resource policy table 200 may specify other attributes to be applied to communication sessions, such as quality of service (QoS) tagging to be applied to communication sessions, channel priority for different communication sessions, security protocols to be enforced for different communication sessions, and so forth.

Having described an example environment in which the techniques described herein may operate, consider now a discussion of example ways of propagating communication awareness of communication sessions in accordance with one or more embodiments.

Propagating Communication Awareness

According to various embodiments, techniques can be employed to dynamically enlighten various entities with communication awareness, such as information about communication sessions, information about network conditions, and so forth. For instance, notification events can be generated that include various attributes of communication sessions and network conditions. The notification events can be propagated to different entities further to techniques for propagating communication awareness over a cellular network discussed herein.

In at least some embodiments, notification events can be configured using a communication application programming interface (API) that can be leveraged to configure and communicate communication awareness to cellular infrastructure components involved in communication sessions, such as the base station controller 110, the base stations 108, and so forth. For example, the communication API can identify dialogue events and session events for which attributes of a communication session and/or network conditions can be identified. Consider, for instance, the following events and attributes that may be conveyed via a notification event generated using the communication API:

Dialogue Events—

These events apply to various portions of a communication session, such as the start, update, and end of a communication session. A dialogue event can include one or more of the following example attributes.

(1) Timestamp: This attribute can be leveraged to specify timestamps for a start of a communication session, updates that occur during a communication session, and an end (e.g., termination) of a communication session.

(2) Source Device Identifier (ID): This attribute can be leveraged to specify an ID for a device that is a source of media during a communication session, e.g., a device that initiates a communication session. With reference to the environment 100, for instance, the source device ID may correspond to an ID for the client device 102 or the endpoint 112. The source device ID may be specified in various ways, such as a media access control address (MAC) address, an Internet Protocol (IP) address, a mobile identification number (MIN), a mobile equipment identifier (MEID), and so forth.

(3) Destination Device Identifier (ID): This attribute can be leveraged to specify an ID for a device that is a source of media during a communication session, e.g., a device that initiates a communication session. With reference to the environment 100, for instance, the source device ID may correspond to an ID for the client device 102 or the endpoint 112. The source device ID may be specified in various ways, such as a media access control address (MAC) address, an Internet Protocol (IP) address, a mobile identification number (MIN), a mobile equipment identifier (MEID), and so forth.

(4) Transport Type: This attribute can be leveraged to specify a transport type or combination of transport types for a communication session. Examples of transport types include Transmission Control Protocol (TCP), User Datagram Protocol (UDP), and so forth.

(5) Source Port: this attribute can be leveraged to specify an identifier for a port at a source device, e.g., a source device identified by the Source Device ID referenced above.

(6) Destination Port: This attribute can be leveraged to specify an identifier for a port at a destination device, e.g., a destination device identified by the Destination Device ID referenced above.

(7) Media Type: This attribute can be leveraged to specify a media type and/or types that are to be transmitted and/or are being transmitted as part of a communication session. As discussed elsewhere herein, the communication session can involve multiple different types of media. Thus, the Media Type attribute can be employed to identify media types in a communication session, such as for applying resource policies discussed herein.

(8) Bandwidth Estimation: This attribute can be leveraged to specify an estimated bandwidth that is to be allocated for a communication session. The estimated bandwidth, for instance, can be based on various factors, such as a privilege level associated with a user, type and/or types of media included in a communication session, and so forth.

(9) To: This attribute can be leveraged to identify a user to which media in a communication session is to be transmitted.

(10) From: This attribute can be leveraged to identify a user from which media in a communication session is transmitted.

(11) Codec: This attribute can be leveraged to specify a codec and/or codec rate utilized as part of a communication session.

(12) QoS: This attribute can be leveraged to specify QoS to be applied to a communication session. Examples of different QoS levels include best effort (BE), expedited forwarding (EF), assured forwarding (AF), and so forth. In at least some implementations, a specified QoS can be used to tag communication session data such that the data can be processed and/or transmitted by other entities according to the specified QoS.

(13) Error Code: This attribute can be leveraged to specify various error codes for errors that may occur as part of a communication session. For example, errors can include errors that occur during initiation the communication session, errors that occurred during a communication session, errors that occur when a communication session is terminated, and so forth.

Session Problem Events—

These events can be generated and applied when a communication session experiences errors, performance degradation, and so forth. A session problem event may include one or more of the attributes discussed above with reference to Dialogue Events, and may also include one or more of the following attributes.

(1) Mean Opinion Score (MOS) Degradation: This attribute can be leveraged to specify a MOS for a communication session. The attribute, for instance, can be used to indicate that an overall quality of a communication session has decreased.

(2) Jitter Inter-Arrival Time: This attribute can be leveraged to specify jitter values for a communication session. The attribute, for instance, can be used to indicate that a jitter value or values have increased, e.g., have exceeded a specified jitter value threshold.

(3) Packet Loss Rate: This attribute can be leveraged to specify a packet loss rate for a communication session. The attribute, for instance, can be used to indicate that a packet loss rate has increased, e.g., has exceeded a specified packet loss rate value threshold.

(4) Round Trip Delay (RTD): This attribute can be leveraged to specify RTD values for packets in communication sessions. The attribute, for instance, can be used to indicate that RTD values for packets have increased, e.g., have exceeded a specified RTD value threshold.

(5) Concealment Ratio: This attribute can be leveraged to specify a cumulative ratio of concealment time over speech time observed after starting a communication session. The attribute, for instance, can be used to specify that a concealment ratio has increased, e.g., has exceeded a specified concealment ratio value threshold.

Thus, various notifications discussed herein can include one or more of the attributes discussed above and can be used to propagate communication awareness to various entities. In at least some implementations, attributes can be linked to particular networks and/or network components to characterize performance attributes of the networks and/or network components.

Having described an example ways of propagating communication awareness, consider now some example implementation scenarios for propagating communication awareness for communication sessions in accordance with one or more embodiments.

Example Implementation Scenarios

The following section describes example implementation scenarios for propagating communication awareness for communication sessions in accordance with one or more implementations. The implementation scenarios may be implemented in the environment 100 discussed above, and/or any other suitable environment.

Figure 3:
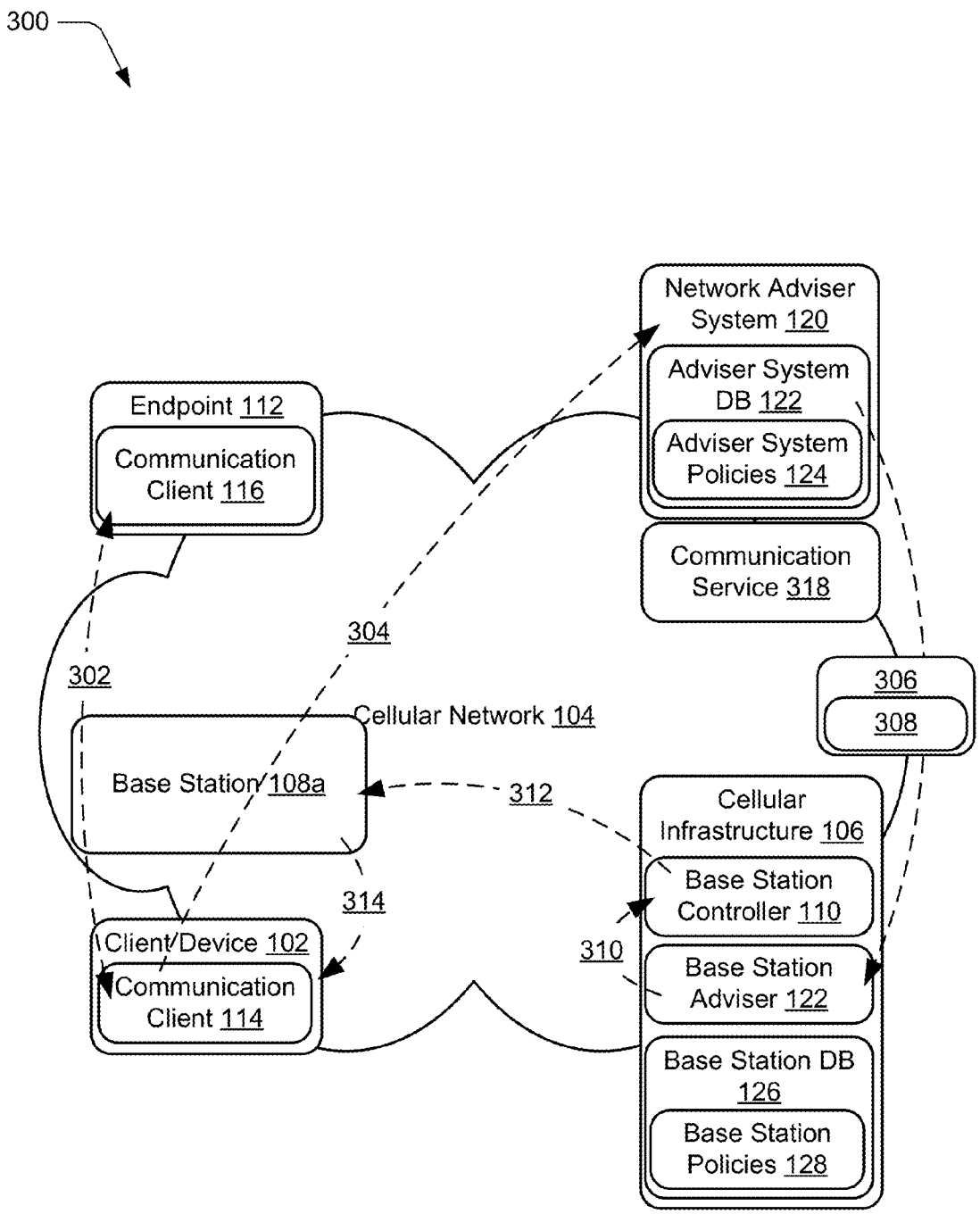
FIG. 3 illustrates an example implementation scenario for propagating communication awareness in accordance with one or more embodiments.

FIG. 3 illustrates an example implementation scenario 300 for propagating communication awareness in accordance with one or more implementations. The scenario 300 includes various entities and components introduced above with reference to the environment 100.

In the scenario 300, a user authenticates the client device 102 with the communication service 118 via the communication client 114. The user then enters a request to initiate a communication session with the endpoint 112. For instance, the user selects an indicia indicating a request to initiate a communication session, such as by entering a phone number for the endpoint 116, selecting a contact from a contact list, selecting a hyperlink, and so forth.

In response to the request to initiate the communication session, a communication session 302 is established between the communication client 114 of the client device 102, and the communication client 116 of the endpoint 112. For instance, the client device 102 communicates (e.g., transmits and receives) data of the communication session via a base station 108a. Generally, the base station 108a represents an instance of the base stations 108 introduced above.

Further in response to the request to initiate the communication session 302, the communication client 114 sends a start session event 304 to the network adviser system 120. The start session event 304 includes information to uniquely identify the communication session 302. For instance, the notification event referenced above can be used to communicate attributes of the communication session 302, such as Source and Destination device IDs, media type(s), codec rate, and so forth.

Based on the start session event 304, the client network adviser 138 generates a session notification 306. Generally, the session notification 306 includes attributes of the communication session 302, examples of which are discussed above. According to one or more implementations, the session notification 306 may include a resource policy 308 for the communication session 302. The resource policy 308, for instance, represents an instance of a resource policy that is generated by applying attributes of the communication session 302 (e.g., media type(s), codec rate, and so forth) to parameters of the resource policy table 200. In at least some implementations, however, the resource policy 308 is optional.

Further to the scenario 300, the network adviser system 120 communicates the session notification 306 to the base station adviser 122. The session notification 306, for example, is communicated to the base station adviser 122 independently of the communication session 302.

The base station adviser 122 receives the session notification 306 and ascertains attributes of the communication session 302 from the session notification 306. The base station adviser 122, for instance, identifies endpoints involved in the communication session 302 (e.g., the client device 102 and the endpoint 112), media type(s) for the communication session 302, and so forth. The base station adviser 122 may ascertain a variety of other attributes of the communication session 302, examples of which are discussed above with reference to the communication API. In at least some implementations, the base station adviser 122 identifies the resource policy 308 from the session notification 306.

According to various implementations, the base station adviser 122 applies data from the session notification 306 to the base station policies 128 to generate a session policy 310 to be applied to the communication session 302. Generally, the session policy 310 includes instructions and/or operational parameters for handling the communication session 302. The session policy 310, for instance, specifies transmission output power level(s) to be communicated to the client device 102, PER threshold for the communication session 302, and so forth. The session policy 310 may optionally specify other parameters for the communication session 302, such as QoS to be applied to the communication session 302, security protocol for the communication session 302, and so on.

In some additional or alternative implementations, the session policy 310 may be generated based on the resource policy 308 included with the session notification 306. For instance, policy attributes of the session policy 310 may be partially or wholly adopted from the resource policy 308.

Continuing with the scenario 300, the base station adviser 122 communicates the session policy 310 to the base station controller 110, which communicates attributes of the session policy 310 as session parameters 312 to the base station 108a. The session parameters 312, for instance, specify operational parameters to be applied by the base station 108a for cellular communication between the client device 102 and the base station 108a. In at least some implementations, the session parameters 312a are session-specific, e.g., are to be applied while the communication session 302 is in progress.

Based on the session parameters 312, the base station 108a communicates session instructions 314 to the client device 102. The session instructions 314, for instance, are communicated as a downlink transmission from the base station 108a to the client device 102. Generally, the session instructions 314 include parameters to be applied by the client device 102 for the communication session 302. For instance, the session instructions 314 specify a transmission power (e.g., in dBm) to be utilized by the client device 102 for transmitting uplink signal to the base station 108a, such as for transmitting data of the communication session 302 to the base station 108a. The session instructions 314 may specify other behaviors to be applied by the client device 102, such as identifiers for cellular channels to be used by the client device 102 for transmitting data of the communication session 302 (e.g., for channel aggregation), a PER threshold, QoS tagging, security protocol, and so forth.

Accordingly, the client device 102 applies the session instructions 314 when transmitting data to the base station 108a. For instance, a radio driver and/or other radio control functionality of the client device 102 can cause cellular signal to be transmitted by the client device 102 according to the specified transmission power. Various other attributes specified by the session instructions 314 can be applied by the client device, examples of which are discussed above.

According to various implementations, when the communication session 302 is terminated, a session termination event may be communicated to the base station controller 110. Accordingly, the base station controller 110 may communicate a termination instructions to the base station 108a. The termination instructions, for instance, instruct the base station 108a to implement default system behaviors that are different than those specified by the session instructions 314. For example, the termination instructions may specify a different transmission power to be implemented by the client device 102 than the transmission power that was applied for the communication session 302. The different transmission power, for instance, may be based on a default power control algorithm utilized by the base station controller 110.

In at least some implementations, the various notifications (e.g., events, instructions, policies, and so forth) discussed in the scenario 300 may be configured using the example notification events discussed above, such as via the communication API detailed above. For instance, values for the various attributes discussed with reference to the communication API can be used to propagate the various information discussed with reference to the scenario 300. Thus, the communication API may be leveraged to propagate communication awareness among different entities involved in communication sessions.

As illustrated in the scenarios, communication awareness of the communication session 302 is propagated independently of the communication session, e.g., via data streams that are independent of the communication session 302. For instance, the various notifications represent instances of communication awareness that may be propagated among entities involved in communication sessions.

While the scenarios are discussed with reference to a communication session between the client device 102 and the endpoint 116, it is to be appreciated that the techniques discussed herein may be employed to propagate communication awareness for multiple communication sessions, e.g., multiple concurrent communication sessions. For instance, the various notifications may be employed to determine and propagate communication awareness to different base stations 108 and for multiple concurrent communication sessions that include the communication session 302, such as part of a conference call that involves the client device 102, the endpoint 116, and other endpoints not expressly illustrated. As another example, the communication session 302 may be part of a multicast communication event from the client device 102 to multiple other endpoints including the endpoint 116. Thus, communication awareness may be propagated to different base station controllers 110 and/or different base stations 108, and for individual communication sessions that are concurrently occurring or scheduled to be implemented concurrently.

While the scenario 300 is discussed with reference to communication awareness being propagated in conjunction with and/or after the communication session 302 is initiated, this is not intended to be limiting. For instance, the various notifications may be generated and communicated prior to initiating the communication session 302. In at least some implementations, for instance, the scenario 300 may be performed in response to detecting that the communication session 302 is scheduled to be initiated. A calendar event, for instance, may indicate that the communication session 302 is scheduled to be initiated at a scheduled future date and time.

Thus, the scenarios may be performed to propagate communication awareness of the communication session 302 prior to the schedule date and time. Such proactive communication awareness may be employed for various purposes, such as enable individual networks to set aside resources to handle the scheduled communication session 302.

In at least some implementations, aspects of the scenario 300 may be performed while a communication session is in progress, such as multiple times during a communication session. For instance, the scenario 300 may be performed periodically during a communication session to maintain active state awareness of communication session conditions. Alternatively or additionally, the scenarios may be performed in response to a trigger event, such as an indication of session problems and/or of network problems within a particular network. Thus, communication awareness propagated according to the scenario 300 may be leveraged for various purposes, such as for session initiation, session diagnostics and repair, session termination, post-session analytics, and so forth.

Accordingly, communication awareness of conditions pertaining to communication sessions over a cellular network can be shared among entities involved in routing and/or handling the communication sessions. Such communication awareness can be leveraged in various ways, such as for optimizing device performance (e.g., signal/noise ratio, battery life, and so on), optimizing communication session quality of experience, mitigating errors that occur and/or may occur in the communication sessions, and so forth.

Having discussed an example implementation scenario, consider now a discussion of some example procedures in accordance with one or more embodiments.

Example Procedures

The following discussion describes some example procedures for propagating communication awareness over a cellular network in accordance with one or more embodiments. The example procedures may be employed in the environment 100 of FIG. 1, the system 800 of FIG. 8, and/or any other suitable environment. The procedures, for instance, represent example procedures for implementing the implementation scenario described above. In at least some embodiments, the steps described for the various procedures can be implemented automatically and independent of user interaction.

Figure 4:
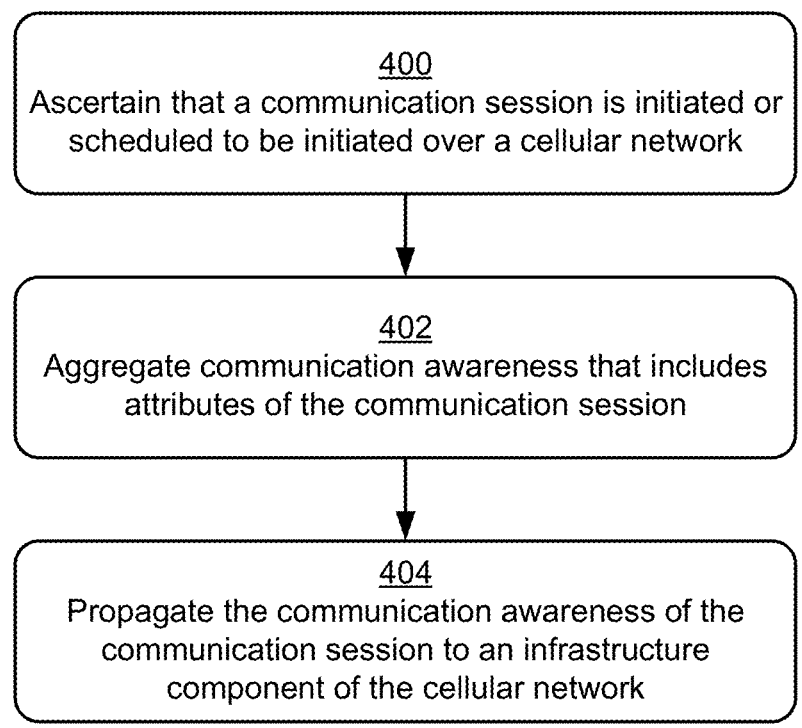
FIG. 4 is a flow diagram that describes steps in a method for propagating communication awareness in accordance with one or more embodiments.

FIG. 4 is a flow diagram that describes steps in a method in accordance with one or more implementations. The method describes an example procedure for propagating communication awareness in accordance with one or more implementations.

Step 400 ascertains that a communication session is initiated or scheduled to be initiated over a cellular network. The communication session, for instance, can be initiated based on user input to initiate a communication session with another endpoint. Alternatively, the communication session can be ascertained to be initiated at a future time, such as based on a scheduled calendar event that includes the communication session. According to various implementations, the network adviser system 120 can ascertain the communication session.

According to various implementations, the communication session is implemented via a data session over the cellular network, and the communication session is managed by a communication service (e.g., the communication service 118) that is separate from a cellular service provider.

Step 402 aggregates communication awareness that includes attributes of the communication session. For example, the network adviser system 120 can receive attributes of a communication session between the client device 102 and the endpoint 112. The attributes can be aggregated into communication awareness of the communication session. Examples of different communication session attributes are described above.

Step 404 propagates the communication awareness of the communication session to an infrastructure component of the cellular network. Generally, an infrastructure component refers to hardware and/or logic deployed in a cellular network for purposes of managing various process and operations that occur within the cellular network. Examples of an infrastructure component include a base station controller, a network controller (e.g., a software-defined network (SDN) controller), a network switch, and so forth. The communication awareness, for instance, is communicated in a data stream separate from a data stream of the communication session. For example, the communication awareness can be communicated prior to initiation of the communication session, after initiation of the communication session, and/or after termination of the communication session.

Figure 5:
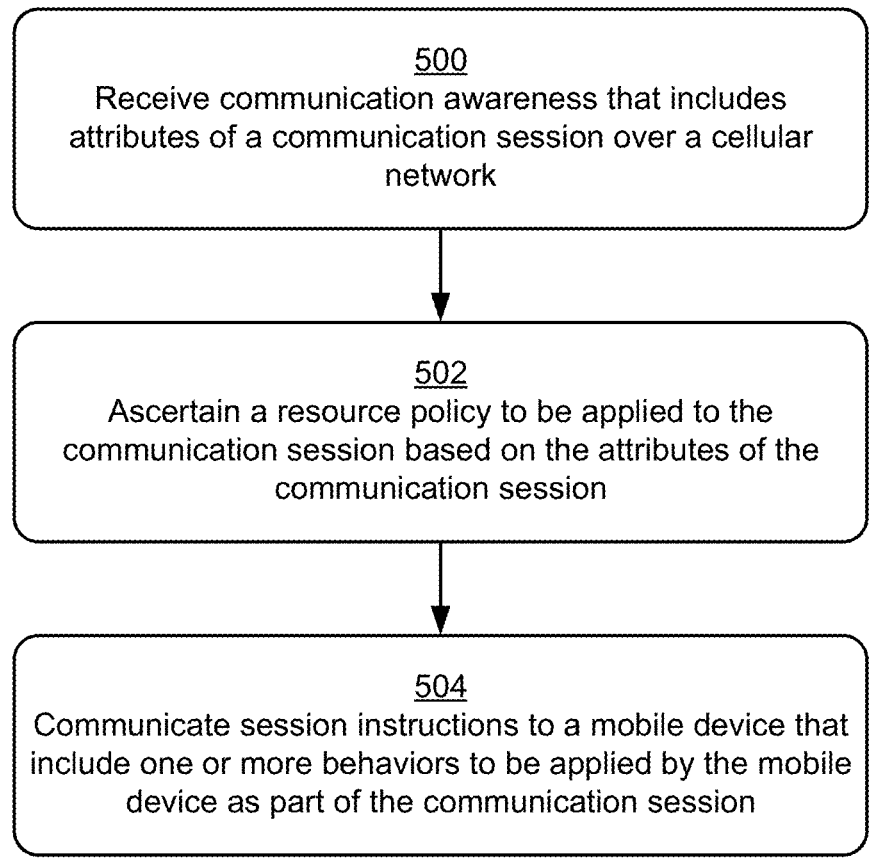
FIG. 5 is a flow diagram that describes steps in a method for specifying communication session behaviors in accordance with one or more embodiments.

FIG. 5 is a flow diagram that describes steps in a method in accordance with one or more implementations. The method describes an example procedure for specifying communication session behaviors in accordance with one or more implementations.

Step 500 receives communication awareness that includes attributes of a communication session over a cellular network. For instance, the base station adviser 122 and/or the base station controller 110 receives communication awareness of a communication session, such as from the network adviser system 120. Examples of different attributes of a communication session are described above.

Step 502 ascertains a resource policy to be applied to the communication session based on the attributes of the communication session. Different resource policies, for instance, can be applied to different communication sessions based on attributes of the different communication sessions. For example, the attributes of the communication session can be applied to the resource policy table 200 to generate parameters for the resource policy. Examples of different resource policy parameters are described above, and include a PER threshold, a transmission power, QoS level, and so forth.

In at least some implementations, a resource policy can specify channel aggregation and/or dynamic channel selection information. For instance, if a communication session is bandwidth-intensive (e.g., for a data heavy communication session), the resource policy can specify that multiple cellular channels are to be aggregated for transmitting and/or receiving data of the communication session.

In another example implementation, a resource policy can specify dynamic channel allocation and/or dynamic channel assignment information that enables cellular channels to be dynamically selected for transmitting and/or receiving data of the communication session. For instance, if a current cellular channel experiences quality problems and/or errors, a different cellular channel can be selected to replace and/or supplement the current cellular channel.

Step 504 communicates session instructions to a mobile device that include one or more behaviors to be applied by the mobile device as part of the communication session. The session instructions, for instance, are communicated by a base station QQ to the client device 102 in a data stream that is separate from the communication session. Examples of different behaviors are described above, and include power level for transmitting signal of the communication session, channels to be aggregated, dynamic channel allocation information, and so forth.

Figure 6:
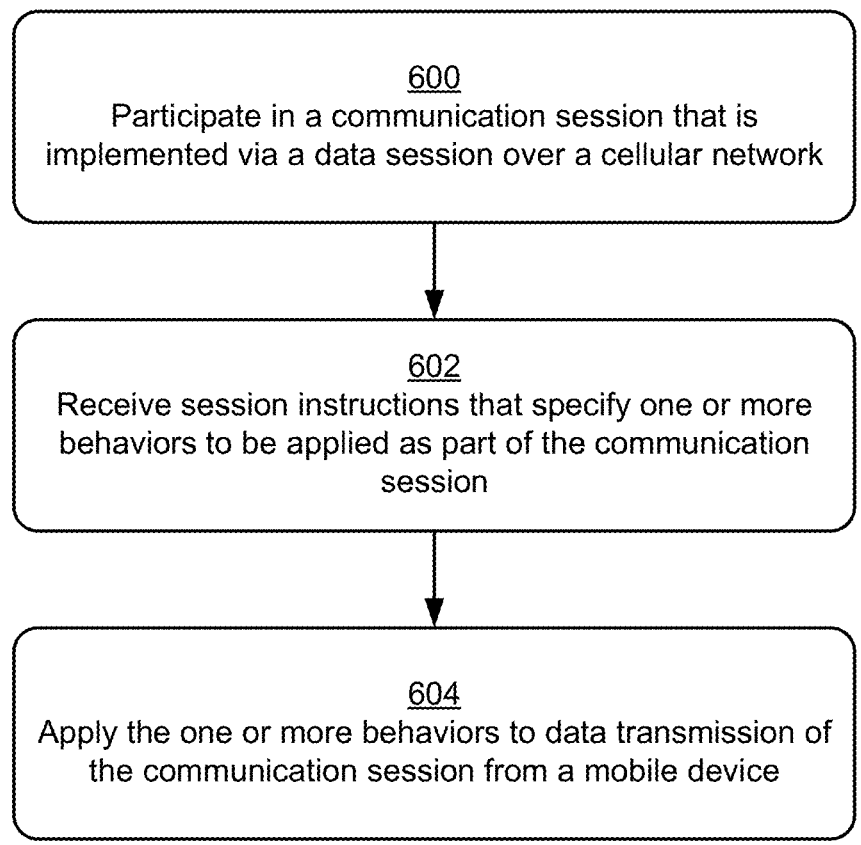
FIG. 6 is a flow diagram that describes steps in a method for applying communication session behaviors in accordance with one or more embodiments.

FIG. 6 is a flow diagram that describes steps in a method in accordance with one or more implementations. The method describes an example procedure for applying communication session behaviors in accordance with one or more implementations.

Step 600 participates in a communication session that is implemented via a data session over a cellular network. According to various implementations, the communication session is managed by a communication service that is separate from a cellular service provider. The communication session, for instance, is managed by the communication service 118. Data of the communication session is communicated via the cellular network 104, which is implemented and managed by the cellular infrastructure 106.

Step 602 receives session instructions that specify one or more behaviors to be applied as part of the communication session. The session instructions, for example, are received separately and independent from a data stream of the communication session. According to various implementations, the session instructions are received from a cellular base station, such as based on a session policy applied by a base station controller.

Step 604 applies the one or more behaviors to data transmission of the communication session from a mobile device. For example, the one or more behaviors can be applied to affect various aspects of data transmission, such as transmission power, channel aggregation, dynamic channel selection, QoS tagging, and so forth. In at least some implementations, the transmission power of the mobile device is changed (e.g., from a default transmission power) based on the one or more behaviors.

Figure 7:
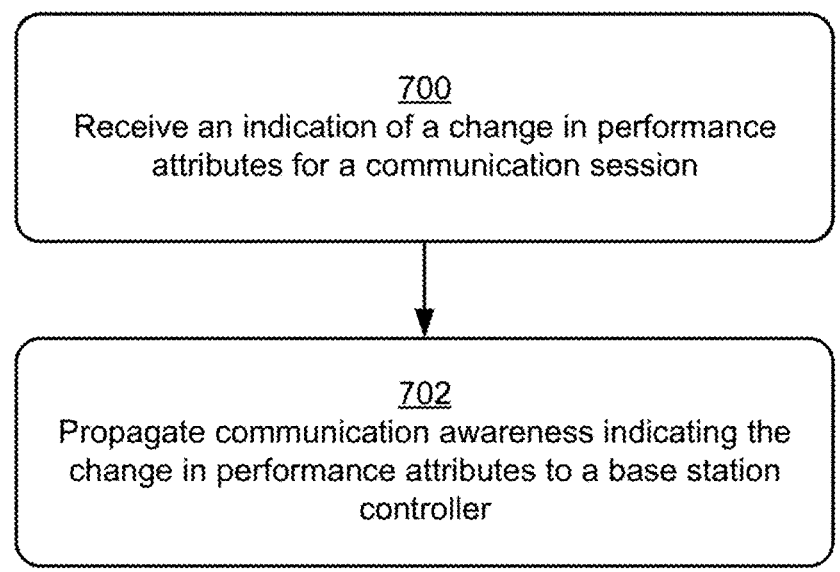
FIG. 7 is a flow diagram that describes steps in a method for propagating awareness of a change in performance attributes of a communication session in accordance with one or more embodiments.

FIG. 7 is a flow diagram that describes steps in a method in accordance with one or more implementations. The method describes an example procedure for QQ in accordance with one or more implementations.

Step 700 receives an indication of a change in performance attributes for a communication session. The performance attributes, for instance, may correspond to a communication session that is in progress. Various changes in performance attributes can be indicated, such as a decrease in session quality, an increase in signal-to-noise ratio, an increase in PER, and so forth. Generally, the change in performance attributes may indicate a session problem for the communication session.

Step 702 propagates communication awareness indicating the change in performance attributes to a base station controller. The network adviser system, for instance, communicates updated communication awareness of the change in performance attributes to the base station adviser 122. In at least some implementations, the updated communication awareness may include an updated session policy to be applied for the communication session. Alternatively or additionally, the updated communication awareness may include updated session attributes that can be applied to generate an updated session policy.

For example, the network adviser system 120 may apply the updated communication awareness to identify an updated session policy from the adviser system policies 124. The network adviser system 120 may communicate the updated session policy to the base station adviser 122, which may cause the updated session policy to be applied for a communication session.

Alternatively or additionally, the network adviser system 120 may communicate the updated communication awareness to the base station adviser 122, which applies the updated communication awareness to the base station policies 128 to ascertain an updated session policy. The base station controller 110 can communication session instructions to a base station QQ to cause the updated session policy to be implemented.

According to various implementations, this method may be employed dynamically during different stages of a communication session to mitigate errors and/or performance degradation that may occur during a communication session.

According to various implementations, the methods described above may be performed multiple times at various stages of a communication session, such as prior to session initiation, concurrent with session initiation, during a communication session, at session termination, and post communication session. For instance, communication awareness of a communication session can be propagated and updated in real-time while the communication session is in progress to maintain dynamic and active state awareness of conditions that may affect the communication session.

Communication awareness of a communication session may also be proactively communicated prior to initiation of the communication session, such as to enlighten autonomous networks of the upcoming communication session and enable the autonomous networks to make adjustments and/or preparations to accommodate the communication session. Communication awareness of a communication session may be communicated after termination of the communication session, such as for system diagnostics and statistical analysis of network performance that occurred during the communication session.

Thus, techniques discussed herein provide a wide variety of scenarios and implementations for propagating communication awareness to different entities involved in routing communication sessions. Communication awareness enables such entities to make informed decisions regarding routing and handling of communication session data.

Having discussed some example procedures, consider now a discussion of an example system and device in accordance with one or more embodiments.

Example System and Device

Figure 8:
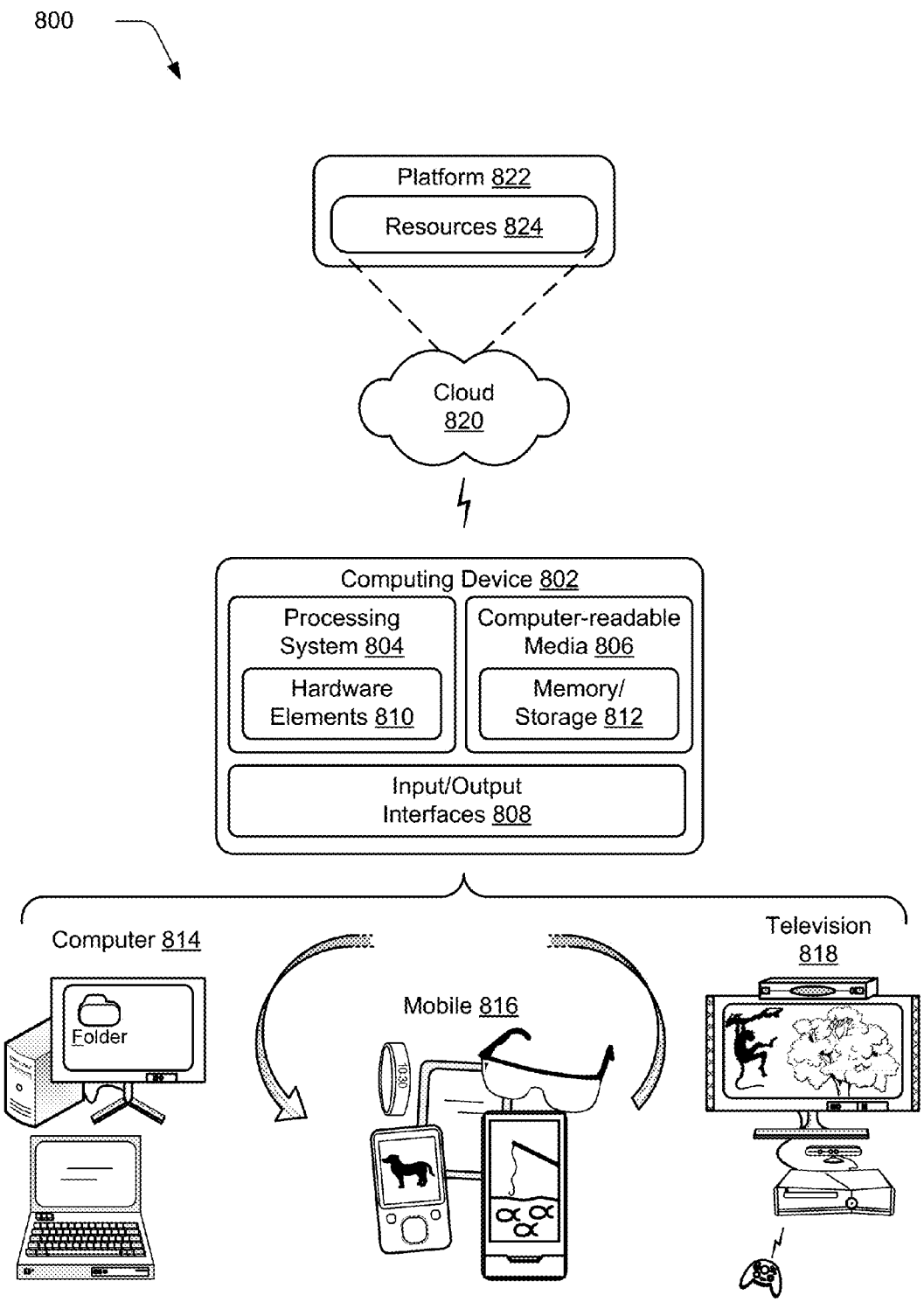
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, various entities and/or components discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a wearable device, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the cellular infrastructure 106, the communication service 118, and/or the network adviser system 120 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Conclusion

Techniques for propagating communication awareness over a cellular network are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method, comprising:
   receiving, prior to initiation of a scheduled communication session over a cellular network, communication awareness that includes attributes of the communication session;
   ascertaining, prior to initiation of the communication session, a resource policy to be applied to the communication session based on the attributes of the communication session; and communicating, in a data stream that is separate from the communication session, session instructions to a mobile device that include one or more behaviors to be applied by the mobile device as part of the communication session.

2. A method as described in claim 1, wherein the communication session is managed by a communication service that is separate from a cellular service provider of the cellular network.

3. A method as described in claim 1, wherein the attributes of the communication session include one or more of a media type of the communication session, a codec rate of the communication session, or a packet error rate threshold of the communication session.

4. A method as described in claim 1, wherein the resource policy is selected from a set of resource policies that are each applicable to communication sessions with different attributes.

5. A method as described in claim 1, wherein the session instructions include a transmission power to be utilized by the mobile device for transmitting data of the communication session.

6. A method as described in claim 1, wherein the session instructions include channel aggregation information to be utilized by the mobile device for transmitting data of the communication session.

7. A method as described in claim 1, wherein the session instructions include dynamic frequency selection information to be utilized by the mobile device for transmitting data of the communication session.

8. A method as described in claim 1, wherein the session instructions include dynamic channel assignment information to be utilized by the mobile device for transmitting data of the communication session.

9. A system comprising:
at least one processor; and
one or more computer-readable storage media including instructions stored thereon that, responsive to execution by the at least one processor, cause the system perform operations including:
   participating in a communication session that is implemented via a data session over a cellular network, the communication session managed by a communication service that is separate from a cellular service provider;
   receiving, separately from a data stream of the communication session, session instructions that specify one or more behaviors to be applied as part of the communication session;
   applying the one or more behaviors to data transmission of the communication session from a mobile device; and
   responsive to the communication session being terminated, receiving different behaviors than the one or more behaviors to be implemented by the mobile device for subsequent data transmission after termination of the communication session.

10. A system as recited in claim 9, wherein the one or more behaviors specify a transmission power to be utilized by the mobile device for transmitting data of the communication session.

11. A system as recited in claim 9, wherein said applying comprises changing a transmission power for transmitting data of the communication session based on the one or more behaviors specified by the session instructions.

12. A method comprising:
participating in a communication session that is implemented via a data session over a cellular network, the communication session managed by a communication service that is separate from a cellular service provider;
receiving, separately from a data stream of the communication session, session instructions that specify one or more behaviors to be applied as part of the communication session;
applying the one or more behaviors to data transmission of the communication session from a mobile device; and
responsive to the communication session being terminated, receiving different behaviors than the one or more behaviors to be implemented by the mobile device for subsequent data transmission after termination of the communication session.

13. A method as recited in claim 12, wherein the one or more behaviors specify a transmission power to be utilized by the mobile device for transmitting data of the communication session.

14. A method as recited in claim 12, wherein said applying comprises changing a transmission power for transmitting data of the communication session based on the one or more behaviors specified by the session instructions.

15. A method as described in claim 12, wherein the one or more behaviors specify channel aggregation information to be utilized by the mobile device for transmitting data of the communication session.

16. A method as recited in claim 12, wherein said applying comprises aggregating transmission channels for transmitting data of the communication session based on the one or more behaviors specified by the session instructions.

17. A method as described in claim 12, wherein the one or more behaviors specify dynamic frequency selection information to be utilized by the mobile device for transmitting data of the communication session.

18. A method as recited in claim 12, wherein said applying comprises changing a transmission frequency for transmitting data of the communication session based on the one or more behaviors specified by the session instructions.

19. A method as described in claim 12, wherein the one or more behaviors specify dynamic channel assignment information to be utilized by the mobile device for transmitting data of the communication session.

20. A method as recited in claim 12, wherein said applying comprises changing a transmission channel for transmitting data of the communication session based on the one or more behaviors specified by the session instructions.

* * * * *